United States Patent
Law

(10) Patent No.: US 6,581,754 B2
(45) Date of Patent: Jun. 24, 2003

(54) CONVEYOR BELT CLEANER

(75) Inventor: Robert R. Law, 720 Tomewin Road, Tomewin QLD 4223 (AU)

(73) Assignee: Robert R. Law, Tomewin (AU)

( * ) Notice: Subject to any disclaimer, the term of this patent is extended or adjusted under 35 U.S.C. 154(b) by 0 days.

(21) Appl. No.: 09/962,701

(22) Filed: Sep. 25, 2001

(65) Prior Publication Data

US 2002/0079196 A1 Jun. 27, 2002

Related U.S. Application Data

(60) Provisional application No. 60/235,857, filed on Sep. 27, 2000.

(51) Int. Cl.[7] .............................................. B65G 45/00
(52) U.S. Cl. .................................... 198/499; 15/256.51
(58) Field of Search ................. 198/499, 497, 198/827; 15/256.5, 256.51

(56) References Cited

U.S. PATENT DOCUMENTS

| | | | | |
|---|---|---|---|---|
| 3,315,794 | A | | 4/1967 | Ellington .................... 198/230 |
| 4,036,351 | A | | 7/1977 | Reiter ......................... 198/499 |
| 4,249,650 | A | * | 2/1981 | Stahura ....................... 198/499 |
| 4,529,084 | A | | 7/1985 | Zhang ......................... 198/499 |
| 4,825,996 | A | | 5/1989 | Davidts |
| 4,825,997 | A | | 5/1989 | Bowman et al. ............ 198/499 |
| 4,953,689 | A | * | 9/1990 | Peterson et al. ........... 198/497 |
| 5,197,587 | A | * | 3/1993 | Malmberg .................. 198/497 |
| 5,310,042 | A | | 5/1994 | Veenhof ...................... 198/497 |
| 5,727,670 | A | | 3/1998 | Johnson ...................... 198/497 |
| 5,797,477 | A | | 8/1998 | Veenhof ...................... 198/499 |
| 5,865,294 | A | | 2/1999 | Betz |
| 6,321,901 | B1 | | 11/2001 | Strebel et al. .............. 198/499 |

FOREIGN PATENT DOCUMENTS

GB 2054504 2/1981

* cited by examiner

Primary Examiner—Kenneth W. Noland
(74) Attorney, Agent, or Firm—Barnes & Thornburg

(57) ABSTRACT

A conveyor belt cleaner including one or more scraper blades and a scraper blade mounting assembly for removably mounting the scraper blades to a support structure. The scraper blades include a mounting base formed of elastomeric material having a generally T-shaped mounting flange and an arm. The scraper blade also includes a metal scraping element having a generally planar lower portion and a generally planar upper portion that are disposed at an angle to one another. The lower portion of the scraping element is embedded within the arm. The upper portion of the scraping element includes a scraping tip adapted to engage a conveyor belt and that is pivotal about a pivot axis that is offset from a plane containing the upper portion of the scraping element. The mounting assembly includes a cross shaft that is adapted to be mounted at each end to a support structure by a slide bracket having a support ridge. The mounting assembly also includes a cartridge having a first sleeve adapted to slidably attach the cartridge to the cross shaft. The cartridge includes a slot adapted to receive the support ridge. The cartridge includes a second sleeve having a channel adapted to receive the generally T-shaped mounting flange of the scraper blades. The cartridge and the scraper blades are selectively slidable with respect to the cross shaft such that they may be removed from the cross shaft while the cross shaft remains mounted to the support structure and the conveyor belt remains in operation.

18 Claims, 4 Drawing Sheets

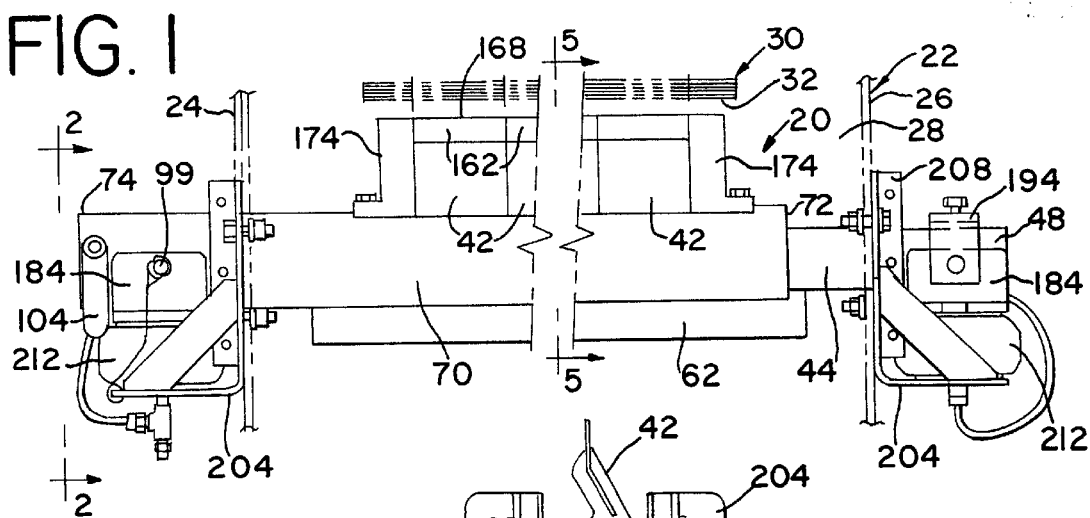
FIG. 1
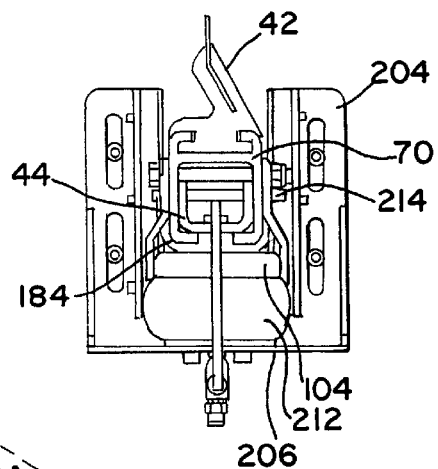
FIG. 2
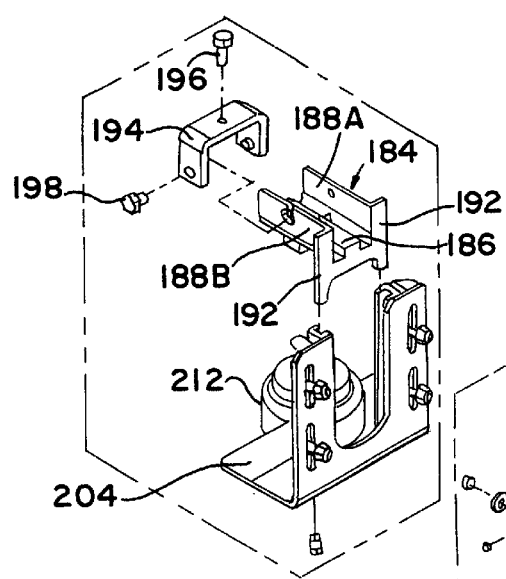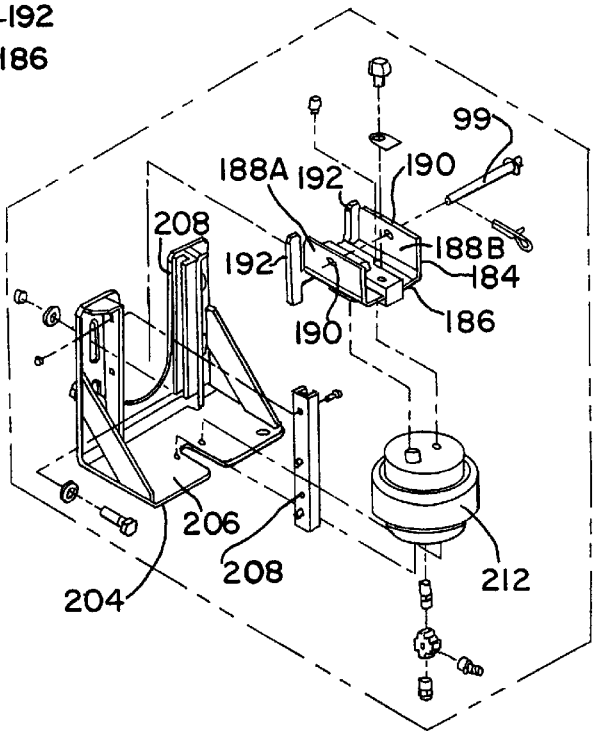
FIG. 3

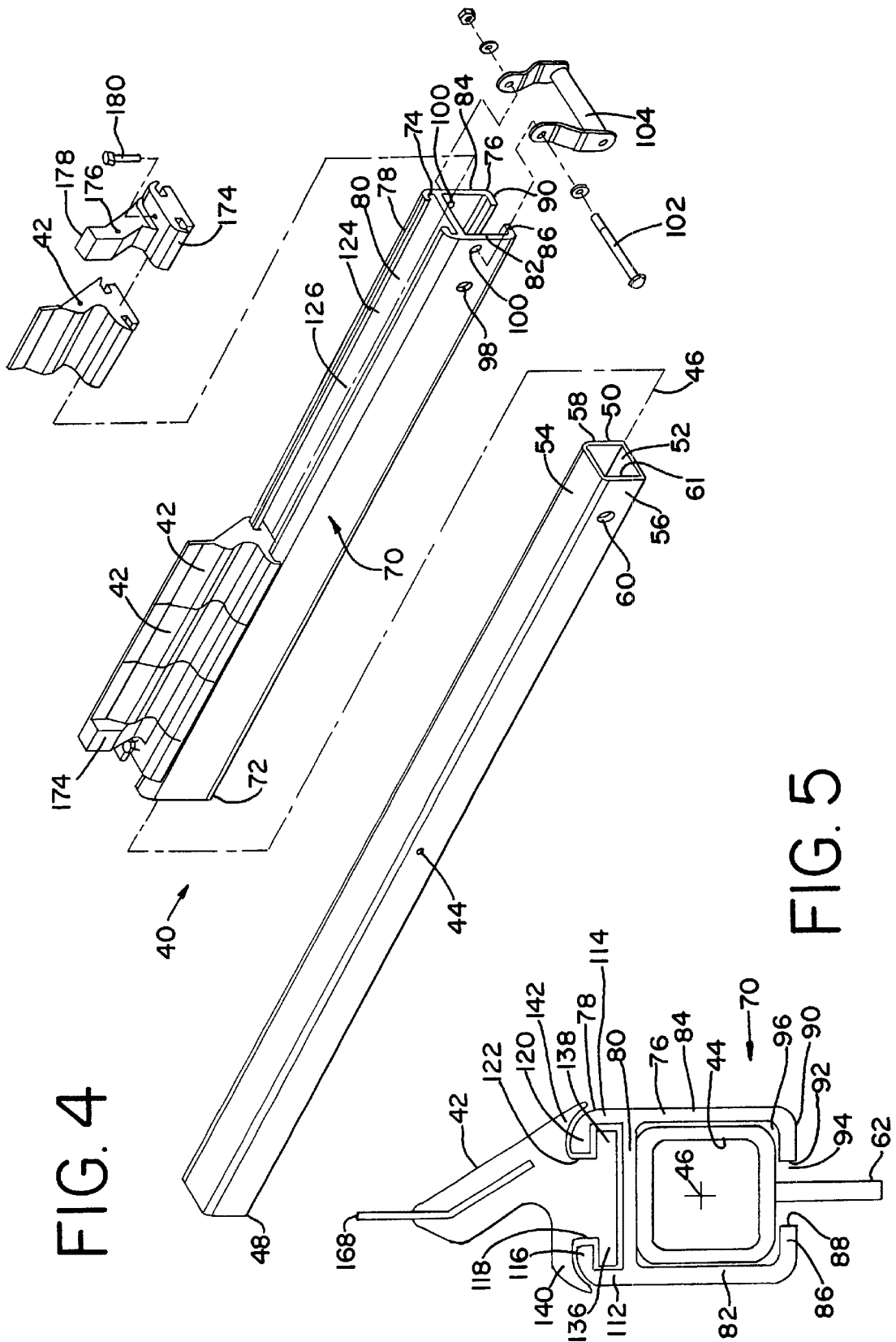

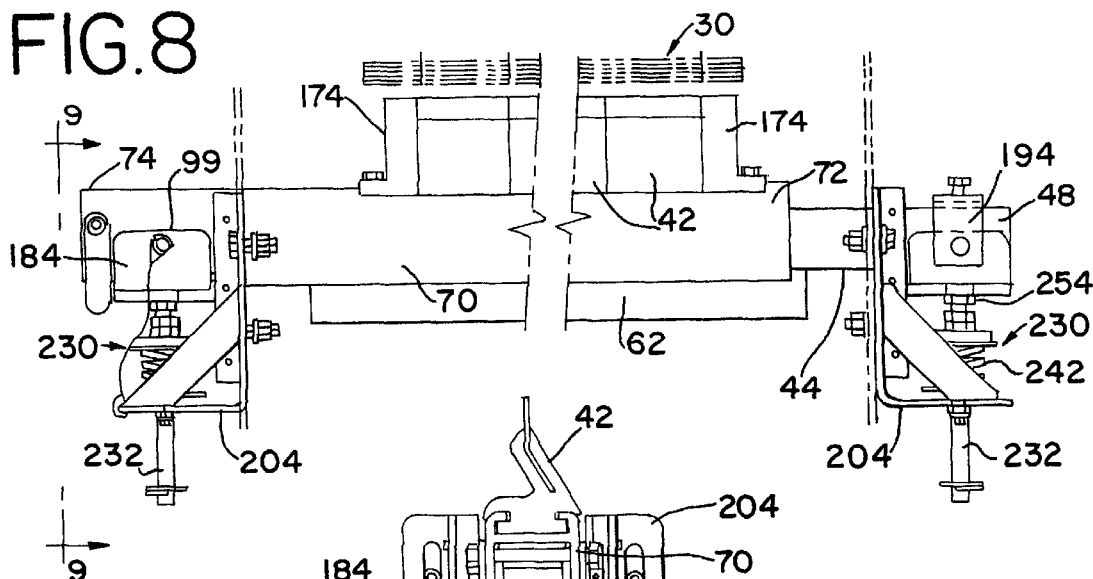
FIG.8
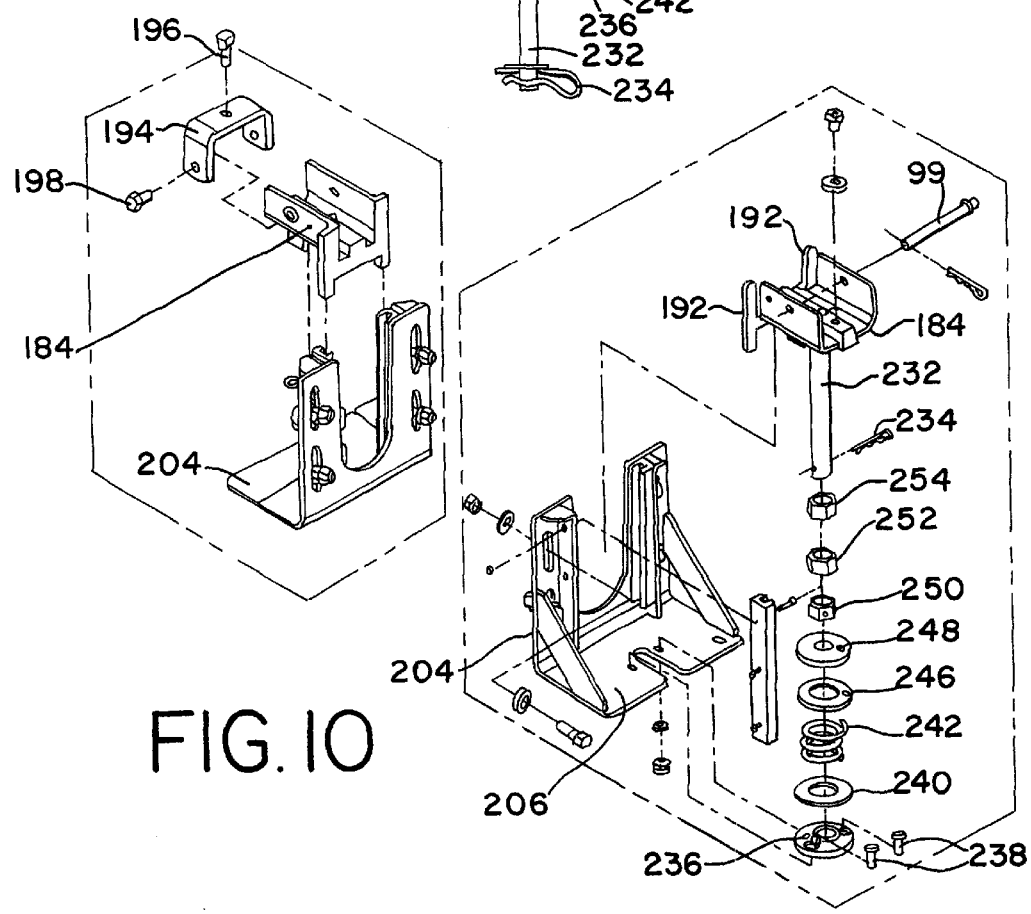
FIG.9
FIG.10

CONVEYOR BELT CLEANER

RELATED APPLICATIONS

This application claims the benefit of U.S. Provisional Application No. 60/235,857, filed Sept. 27, 2000.

BACKGROUND OF THE INVENTION

The present invention is directed to a conveyor belt cleaner, and in particular to a conveyor belt cleaner including one or more scraper blades slidably mounted to a cartridge wherein the cartridge is slidably mounted on a support shaft, such that the cartridge and scraper blade assembly is selectively slidably removable and replaceable from the support shaft.

Conveyor belt cleaners include scraper blades that engage a moving conveyor belt to remove conveyed material that continues to adhere to the belt after the remainder of the conveyed material has been discharged. Scraper blades wear or become damaged during use and periodically require replacement. Conveyors are typically shut down when scraper blades require replacement so that service personnel can obtain access to the scraper blades for removal and replacement while avoiding injury that could potentially occur if the conveyor belt were moving. Conveyor belt cleaners also often require service due to a buildup of the conveyed material on the scraper blade after the material has been removed from the belt which decreases the cleaning efficiency of the scraper blade. The present invention allows the removal and replacement of scraper blades while the conveyor remains in operation and reduces material buildup on the scraper blades to provide increased cleaning efficiency over the life of the scraper blades.

SUMMARY OF THE INVENTION

A conveyor belt cleaner including a scraper blade mounting assembly and one or more conveyor belt cleaner scraper blades. The mounting assembly includes a cross shaft having a first end, a second end and a generally linear central axis. The first and second ends of the cross shaft are adapted to be mounted to a support structure such as a conveyor chute. The mounting assembly includes a cartridge having a first end, a second end, a first sleeve and a second sleeve. The first sleeve includes a first leg and a second leg spaced apart from the first leg. A chamber is formed between the first and second legs which is adapted to receive the cross shaft such that the cartridge is slidable with respect to the cross shaft along the central axis, but such that the cartridge is not rotatable about the central axis with respect to the cross shaft. The first sleeve includes a slot that extends from the first end to the second end of the cartridge and that is in communication with the chamber. The second sleeve includes a generally T-shaped channel adapted to slidably mount the scraper blades to the cartridge. A respective slide bracket is attached to each end of the cross shaft. Each slide bracket includes a bottom wall and a raised support ridge extending upwardly from the bottom wall which is attached to the cross shaft and which spaces the cross shaft apart from the bottom wall of the slide bracket. The raised ridge is adapted to be located within the slot of the cartridge such that the cartridge can be slid with respect to the cross shaft along the central axis past the slide bracket. The mounting assembly includes a mounting bracket adapted to be attached to the stationary structure which includes a guideway adapted to slidably receive the slide bracket. A tensioner is located between the mounting bracket and the slide bracket. The slide bracket is vertically slidable within the guideway with respect to the mounting bracket. The tensioner provides sliding movement of the slide bracket, cross shaft and cartridge with respect to the mounting bracket.

The scraper blade includes a mounting base formed from an elastomeric material including a generally T-shaped mounting flange which is adapted to be slidably inserted within the channel of the second sleeve of the cartridge. The mounting base also includes an arm having a top end, a bottom end attached to the mounting flange, a front surface and a rear surface. The scraper blade also includes a scraping element formed from a metal material having a generally planar lower portion and generally planar upper portion, the lower portion being disposed at an angle to the upper portion. The lower portion of the scraping element is embedded within the arm between the front surface and the rear surface of the arm. The upper portion of the scraping element includes a scraping tip adapted to engage a conveyor belt. The front surface of the arm is generally planar and is disposed at an angle to the upper portion of the scraping element. The scraping tip is pivotal about a pivot axis that is offset from a plane containing the upper portion of the scraping element.

BRIEF DESCRIPTION OF THE DRAWING FIGURES

FIG. 1 is a front elevational view of the conveyor belt cleaner of the present invention.

FIG. 2 is a side elevational view of the conveyor belt cleaner taken along line 2—2 of FIG. 1.

FIG. 3 is an exploded view of the cross shaft mounting assembly for the conveyor belt cleaner including pneumatic tensioners.

FIG. 4 is an exploded view of the cross shaft, cartridge and scraper blade assembly.

FIG. 5 is a cross-sectional view of the conveyor belt cleaner taken along line 5—5 of FIG. 1.

FIG. 8 is a front elevational view of a modified embodiment of the conveyor belt cleaner of the present invention mounted with spring tensioners.

FIG. 9 is a side elevational view taken along line 9—9 of FIG. 8.

FIG. 10 is an exploded view of the cross shaft mounting assembly of FIG. 8 including spring tensioners.

DETAILED DESCRIPTION OF THE PREFERRED EMBODIMENTS

Figure 6:
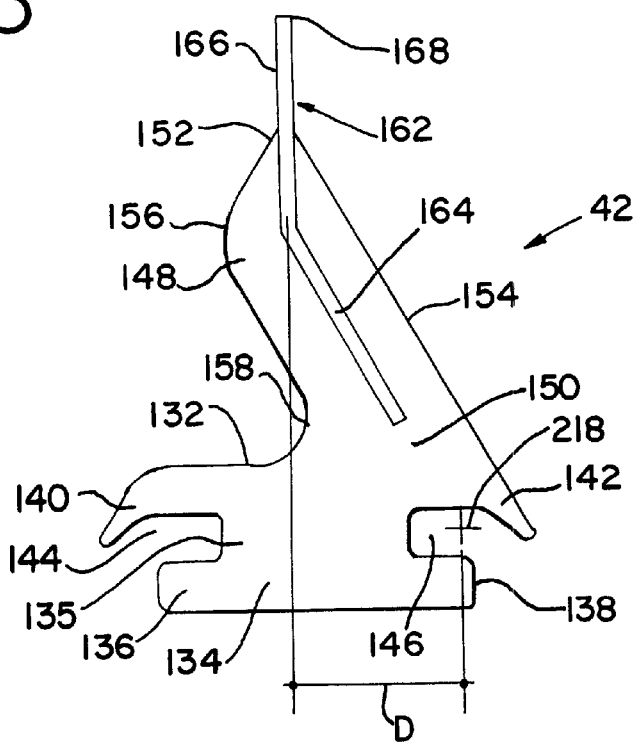
FIG. 6 is a cross-sectional view of the scraper blade of the present invention shown in a relaxed condition.

The conveyor belt cleaner 20 of the present invention, as shown in FIG. 1, is adapted to be removably mounted to a stationary structure such as a conveyor chute housing 22. The housing 22 includes a first side wall 24 and a spaced apart second side wall 26 which form a chamber 28 therebetween. A conveyor belt 30, having an outer surface 32 for carrying conveyed material, is located within the chamber 28. The conveyor belt cleaner 20 is disposed beneath the return run of the conveyor belt 30.

As best shown in FIGS. 4 and 5, the conveyor belt cleaner 20 includes a scraper blade mounting assembly 40 which is adapted to removably mount one or more scraper blades 42 to the conveyor chute housing 22. The mounting assembly 40 includes a generally linear and elongate cross shaft 44. The cross shaft 44 includes a central axis 46 that extends between a first end 48 and a second end 50. The cross shaft 44 is preferably formed as a rectangular or square tube having a hollow rectangular bore extending from the first end 48 to the second end 50. The cross shaft 44 includes a generally planar bottom wall 52, a generally planar top wall 54, a generally planar first side wall 56, and a generally planar second side wall 58. The side walls 56 and 58 each include an aperture 60 located adjacent the second end 50 of the cross shaft 44. The apertures 60 are located coaxially across from one another. The bottom wall 52 of the cross shaft 44 includes apertures 61 at each end 48 and 50. As shown in FIG. 5, the cross shaft 44 may include a stiffener 62, such as a plate, which is attached to and extends downwardly from the bottom wall 52 of the cross shaft 44. As shown in FIG. 1, the stiffener 62 is centered on the cross shaft 44 but does not extend to the ends 48 and 50. The cross shaft 44 preferably includes a stiffener 62 to reduce deflection of the cross shaft 44 when the width of the conveyor belt 30 is sufficiently large. The cross shaft 44 is preferably made from metal.

The mounting assembly 40 also includes an elongate cartridge 70 that extends generally linearly between a first end 72 and a second end 74. The cartridge 70 includes a lower sleeve 76 adapted to slidably receive the cross shaft 44 and an upper sleeve 78 adapted to slidably receive one or more scraper blades 42. The lower sleeve 76 and the upper sleeve 78 include a common generally horizontal and planar central wall 80. The lower sleeve 76 includes a first leg 82 and a second leg 84 that are spaced apart and generally parallel to one another. The first and second legs 82 and 84 extend downwardly from opposite ends of the central wall 80. A first foot 86 is attached to the bottom end of the first leg 82 and extends inwardly to an edge 88. A second foot 90 is attached to the bottom end of the second leg 84 and extends inwardly to an edge 92. The feet 86 and 90 are generally co-planar with one another and are spaced apart from one another by a slot 94 located between the edges 88 and 92. The slot 94 extends from the first end 72 to the second end 74 of the cartridge 70. The slot 94 is in communication with a chamber 96 formed between the first leg 82 and the second leg 84 of the lower sleeve 76. The slot 94 and chamber 96 form a generally T-shaped track or channel that extends the length of the cartridge 70.

As shown in FIG. 5, the chamber 96 of the lower sleeve 76 is adapted to receive the cross shaft 44 such that the walls of the cross shaft 44 engage the central wall 80, legs 82 and 84, and feet 86 and 90 of the lower sleeve 76 with a running fit such that the cartridge 70 is slidable along the central axis 46 with respect to the cross shaft 44. However, the cartridge 70 cannot rotate about the central axis 46 with respect to the cross shaft 44. The lower sleeve 76 of the cartridge 70 thereby slidably mounts the cartridge 70 to the cross shaft 44. The first and second legs 82 and 84 of the lower sleeve 76 each include an aperture 98. The apertures 98 are located coaxially with respect to one another. The apertures 98 are adapted to be aligned with the apertures 60 in the cross shaft 44 such that a fastener 99, such as a pin as shown in FIG. 3, can be removably inserted therethrough to prevent sliding movement of the cartridge 70 with respect to the cross shaft 44. The first and second legs 82 and 84 of the lower sleeve 76 also each include an aperture 100. The apertures 100 are located coaxially with respect to one another. The apertures 100 are adapted to receive a fastener 102 such as a bolt. The fastener 102 attaches a generally U-shaped handle 104 to the second end 74 of the cartridge 70 such that the handle 104 is pivotal about the central axis of the fastner 102.

The upper sleeve 78 of the cartridge 70 includes a first leg 112 and a second leg 114 which extend upwardly from opposite ends of the central wall 80. The first leg 112 is generally co-planar with the first leg 82 of the lower sleeve 76 and the second leg 114 is generally co-planar with the second leg 84 of the lower sleeve 76. A first foot 116 is attached to the upper end of the first leg 112 and extends inwardly to an edge 118. A second foot 120 is attached to the upper end of the second leg 114 and extends inwardly to an edge 122. The edges 118 and 122 are spaced apart and generally parallel to one another and form an elongate slot 124 therebetween. The slot 124 is in communication with a chamber 126 that is formed between the first leg 112 and second leg 114, and between the central wall 80 and the feet 116 and 120. The slot 124 and chamber 126 form a generally T-shaped track or channel which extends along the length of the cartridge 70 and which is adapted to slidably receive and mount one or more scraper blades 42 to the cartridge 70. The cartridge 70 may be made from metal materials such as steel, aluminum or stainless steel, or from rigid plastic materials.

The scraper blade 42 as best shown in FIG. 6 includes a mounting base 132. The mounting base 132 includes an inverted generally T-shaped mounting flange 134. The mounting flange 134 includes a stem 135, an outwardly extending first tongue 136 and an outwardly extending second tongue 138. The tongues 136 and 138 extend outwardly from the stem 135 of the mounting flange 134 in opposite directions relative to one another. A first apron 140 extends outwardly from one side at the top end of the stem 135 and a second apron 142 extends outwardly from an opposite side at the top end of the stem 135. A groove 144 is formed between the first tongue 136 and the first apron 140 that is adapted to receive the first foot 116 of the upper sleeve 78 of the cartridge 70. A groove 146 is formed between the second tongue 138 and the second apron 142 that is adapted to receive the second foot 120 of the upper sleeve 78 of the cartridge 70. The stem 135 is adapted to fit within the slot 124 closely between the edges 118 and 122 of the feet 116 and 120. The tongues 136 and 138 are adapted to fit within the chamber 126 of the upper sleeve 78 respectively between the first foot 116 and the central wall 80 and between the second foot 120 and the central wall 80 of the upper sleeve 78. The first apron 140 extends over the first foot 116 and the second apron 142 extends over the second foot 120 to prevent the conveyed material from entering the slot 124 or chamber 126 of the upper sleeve 78 and further to prevent the conveyed material from becoming lodged between the sliding surfaces of the scraper blade 42 and the upper sleeve 78.

The mounting base 132 also includes an upwardly extending arm 148. The arm 148 includes a bottom end 150 and a top end 152. The arm 148 is disposed at an angle of approximately thirty degrees to vertical as shown in FIG. 6. The bottom end 150 of the arm 148 is attached to the mounting flange 134 off-center such that the bottom end 150 is connected to the second apron 142 and to a portion of the stem 135 that is located most closely adjacent to the second apron 142. The arm 148 includes a generally planar front surface 154 that extends from the top end 152 of the arm 148 to the second apron 142. The arm 148 also includes a rear surface 156 that extends from the top end 152 of the arm 148 to the stem 135 of the mounting flange 134. The bottom end 158 of the rear surface 156 is concavely curved. The mounting base 132 is preferably formed from a resilient elastomeric material such as urethane or rubber. If desired, the mounting flange 134 can be formed from metal with the aprons 140 and 142 and the arm 148 being formed from an elastomeric material that is bonded to the metal mounting flange 134.

The scraper blade 42 also includes a scraping element 162 which is attached to the arm 148 of the mounting base 132. The scraping element 162 includes a generally planar lower portion 164 that is embedded within the arm 148 and that is located generally parallel to the front surface 154. The lower portion 164 is disposed at an angle of approximately thirty degrees to vertical. The scraping element 162 also includes a generally planar upper portion 166 that extends generally vertically upwardly from the top end of the lower portion 164 as shown in FIG. 6 when the conveyor belt 30 is not applying a horizontal force to the scraping element 162. The upper portion 166 of the scraping element 162 includes a bottom end that is embedded within the arm 148. The upper portion 166 extends to a scraping tip 168 that is adapted to engage the outer surface 32 of the conveyor belt 30. As shown in FIG. 6, the front surface 154 of the arm 148 is generally planar from the upper portion 166 of the scraping element 162 to the end of the second apron 142. The scraping element 162 is preferably made from metal such as tool steel or tungsten carbide. As shown in FIG. 6, the upper portion 166 of the scraping element 162 is located behind, or toward the side of the mounting base 132 that includes the first apron 140, with respect to the concavely curved bottom end 158 of the rear surface 156.

As best shown in FIGS. 1 and 4, one or more scraper blades 42 are slidably and removably mounted to the upper sleeve 78 of the cartridge 70. A locking scraper blade 174 is mounted to the upper sleeve 78 of the cartridge 70 at each end of the adjacent scraper blades 42. The locking blade 174 includes a mounting flange and first and second aprons as does the mounting base 132 of the scraper blade 42. The locking blade 174 includes an arm 176 which extends upwardly from the mounting flange to a scraping tip 178. The arm 176 and scraping tip 178 are formed from a resilient elastomeric material such as urethane or rubber. A set screw 180 is threadably attached to the mounting flange of the locking blade 174 such that the lower tip of the set screw 180 is adapted to releasably engage the central wall 80 of the cartridge 70 to prevent lateral sliding movement of the locking blade 174 and of the adjacent scraper blades 42. The set screw 180 can be loosened such that the locking blade 174 and the scraper blades 42 can be slid along the upper sleeve 78 parallel to the axis 46 for removal and replacement. The arm 78 of the locking blade 174 is made from an elastomeric material to protect the belt 30 from potential damage from the corners of the metal scraping elements 162 of the scraper blades 42.

A respective slide bracket 184, as best shown in FIG. 3, is attached to each end 48 and 50 of the cross shaft 44. Each slide bracket 184 includes a bottom wall having a raised central ridge 186. The ridge 186 is attached to the bottom wall 52 of the cross shaft 44 by fasteners that extend through the ridge 186 and the apertures 61 in the bottom wall 52. The ridge 186 spaces the bottom wall 52 of the cross shaft 44 apart from the bottom wall of the slide bracket 184. The ridge 186 is adapted to be located within the slot 94 of the cartridge 70 when the cartridge 70 is slid past the slide bracket 184. The slide bracket 184 also includes upwardly extending legs 188A and B that are spaced apart from the side walls 56 and 58 of the cross shaft 44, such that the legs 82 and 84 of the lower sleeve 76 of the cartridge 70 may be located therebetween. The legs 188A–B include respective apertures 190 which are adapted to receive the fastener 99. The slide bracket 184 also includes a pair of outwardly extending ears 192. The slide bracket 184 that is adapted to be attached to the first end 48 of the cross shaft 44 includes a generally U-shaped bracket 194 having a set screw 196.

The bracket 194 is attached to the slide bracket 184 by fasteners 198 which threadably engage the apertures 190 in the slide bracket 184. The bracket 194 is adapted to extend around the cross shaft 44. The set screw 196 selectively engages the top wall 54 of the cross shaft 44 to further secure the cross shaft 44 to the slide bracket 184.

A first mounting bracket 204 is adapted to be attached to the exterior of the first side wall 24 of the conveyor housing 22 and a second mounting bracket 204 is adapted to be attached to the exterior of the second side wall 26 of the conveyor housing 22. Each mounting bracket 204 includes a generally horizontal shelf 206 and a pair of opposing and spaced apart vertical guideways 208. Each guideway 208 includes a vertical generally U-shaped channel adapted to receive a respective ear 192 of a slide bracket 184. The ears 192 of the slide bracket 184 fit within the guideways 208 of the mounting bracket 204 such that the slide bracket 184 is vertically slidable upwardly and downwardly with respect to the mounting bracket 204. The mounting bracket 204 prevents movement of the slide bracket 184 in directions other than vertically upwardly or downwardly. A pneumatic tensioner 212 is attached to and disposed between the shelf 206 of the mounting bracket 204 and the slide bracket 184.

As shown in FIG. 1, the cross shaft 44 extends across the width of the chamber 28 of the housing 22 and through the sidewalls 24 and 26 of the conveyor housing 22. Each end 48 and 50 of the cross shaft 44 is connected to and supported by a respective slide bracket 184. Each slide bracket 184 is mounted on and vertically supported by a respective pneumatic tensioner 212. The tensioners 212 provide selective vertical movement, upward and downward, of the cross shaft 44 and of the cartridge 70 and scraper blades 42 and 174 mounted thereon. The pneumatic tensioners 212 thereby selectively bias the scraper blades 42 and 174 into scraping engagement with the conveyor belt 30.

When the scraper blades 42 or 174 become worn, damaged, or otherwise require service, the pneumatic tensioners 212 lower the cross shaft 44, cartridge 70 and scraper blades 42 and 174 out of engagement with the moving conveyor belt 30. The fastener 99 is withdrawn from the apertures 190 in the slide bracket 184, from the apertures 60 in the cross shaft 44 and from the apertures 98 in the cartridge 70, such that the cartridge 70 can be slid along the axis 46 with respect to the cross shaft 44. The handle 104 is then manually grasped and pulled to slide the cartridge 70 and the attached scraper blades 42 and 174 along the axis 46 with respect to the cross shaft 44 until the cartridge 70 and the scraper blades are entirely removed from the cross shaft 44 and from the chamber 28 while the conveyor belt 30 is moving. The scraper blades 42 and 174 may then be removed and replaced from the upper sleeve 78 of the cartridge 70 outside of the conveyor housing 22. Once the scraper blades 42 and 174 have been replaced or repaired, the cartridge 70 and the scraper blades mounted thereon can be reinstalled by inserting the first end 48 of the cross shaft 44 into the lower sleeve 76 at the first end 72 of the cartridge 70 and sliding the cartridge 70 along the cross shaft 44 until the apertures 98 in the cartridge 70 align with the apertures 60 in the cross shaft 44. The fastener 99 is then inserted therethrough to prevent longitudinal sliding movement of the cartridge 70 with respect to the cross shaft 44. The pneumatic tensioners 212, upon actuation, vertically raise the cross shaft 44, cartridge 70 and scraper blades 42 and 174 until the scraper blades engage the moving conveyor belt 30 with the desired biasing force. The cartridge 70 and scraper blades 42 and 174 mounted thereon can be removed and replaced from the cross shaft 44 while the conveyor belt 30 is moving and is in operation without creating any hazard to the service personnel.

Figure 7:
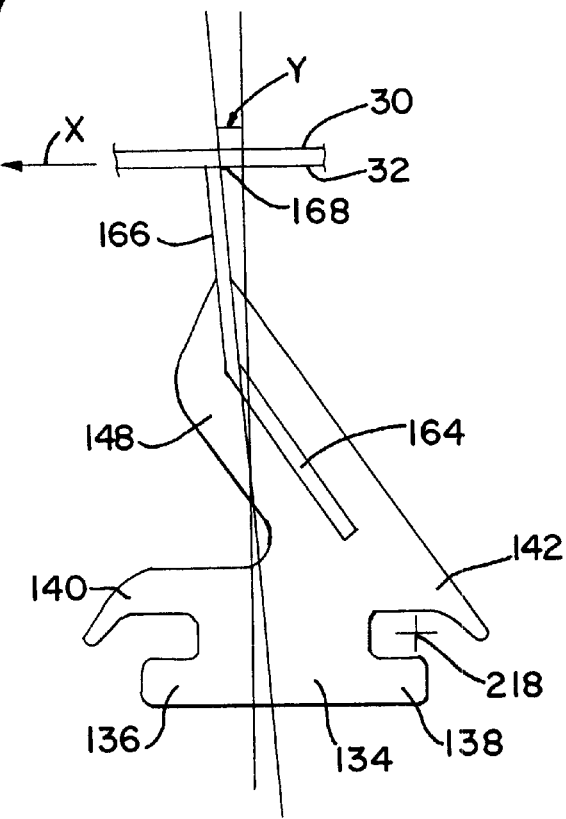
FIG. 7 is a cross-sectional view of the scraper blade of the present invention shown in operational engagement with a moving conveyor belt.

As shown in FIG. 6, when the scraper blade 42 is in a relaxed position or is disengaged from the conveyor belt 30, the upper portion 166 of the scraping element 162 is substantially vertical. As shown in FIG. 7, when the scraper blade 42 engages the conveyor belt 30 and the conveyor belt 30 is moving in the direction of the arrow "X", the conveyor belt 30 will pivot the scraping element 162 and arm 148 about a pivot axis 218. As shown in FIGS. 6 and 7, the pivot axis 218 is offset from the vertical plane containing the upper portion 166 of the scraping element 162 a distance "D" of approximately thirty-five millimeters. The pivot axis 218 is located within the groove 146 formed between the second tongue 138 and the second apron 142 of the mounting base 132. In particular, the pivot axis 218 is located approximately at the intersection of a plane containing the lower portion 164 of the scraping element 162 and a plane extending through the grooves 144 and 146 approximately midway between the tongues 136 and 138 and the aprons 140 and 142. The upper portion 166 of the scraping element 162 is thereby pivoted in a counterclockwise direction an angle "Y" of approximately five degrees. The pivoting of the upper portion 166 and scraping tip 168 of the scraping element 162 about the pivot axis 218 provides vertical movement of the scraping tip 168 of approximately three and one-half millimeters to four millimeters. The inherent memory of the resilient elastomeric material from which the mounting base 132 is formed biases the scraping element 162 toward its original vertical position as shown in FIG. 6 thereby insuring proper pressure is maintained between the scraping element 162 and the conveyor belt 30 during operation. The sloped planar front surface 154 of the scraper blade 42 conveys material which is scraped from the conveyor belt 30 away from the scraper blade 42 to prevent accumulation of conveyed material on the scraper blade 42.

FIGS. 8–10 show the conveyor belt cleaner of the present invention mounted with spring tensioners 230, rather than pneumatic tensioners 212. Each spring tensioner 230 includes a threaded rod 232 attached at its upper end to the underside of a slide bracket 184. The bottom end of the rod 232 includes a cotter pin 234. The rod 232 extends vertically through a lower spring locating washer 236 that is attached to the shelf 206 of the mounting bracket 204 by fasteners 238. The rod 232 also extends through a washer 240, a resilient coil spring 242, a washer 246 and an upper spring locating washer 248. A nut 250 is threadably attached to the rod 132 above the washer 248. A lock nut 252 and a lock nut 254 are also threadably attached to the rod 232. The lock nut 254 engages the slide bracket 184 to prevent rotation of the rod 232 with respect to the slide bracket 184.

The spring tensioner 230 biases the scraper blades 42 into engagement with the conveyor belt 30 by manually rotating the nut 250 in the appropriate direction to vertically raise the rod 232 and the slide bracket 184 and cross shaft 44 attached thereto. Once the scraper blades 42 engage the conveyor belt 30, continued rotation of the nut 250 will compress the spring 242 until the spring 242 biases the scraper blades 42 into contact with the conveyor belt 30 with a biasing force of desired magnitude. The lock nut 252 is then rotated into engagement with the nut 250 to lock the nut 250 in place with respect to the rod 232. The springs 242 thereby resiliently bias the scraper blades 42 and 174 into scraping engagement with the conveyor belt 30. The cartridge 70 is removable and replaceable from the cross shaft 44 when the cross shaft 44 is supported by the spring tensioners 230 as shown in FIGS. 8–10 in the same manner as when the pneumatic tensioners 212 are used as shown in FIGS. 1–3.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A mounting assembly for mounting one or more conveyor belt cleaner scraper blades to a support structure, said mounting assembly including:
    a cross shaft having a first end, a second end and a generally linear central axis, said first end and said second end of said cross shaft adapted to be mounted to the support structure;
    a cartridge having a first end, a second end and a first sleeve, said first sleeve including a first leg, a second leg spaced apart from said first leg, a chamber located between said first leg and said second leg adapted to receive said cross shaft, and a slot in communication with said chamber, said slot adapted to facilitate removal of said cartridge from said cross shaft, said cartridge adapted to mount the scraper blades to said cross shaft; and
    a slide bracket attached to said first end of said cross shaft, said slide bracket including a wall and a raised ridge extending from said wall, said raised ridge adapted to space said cross shaft from said wall of said slide bracket, said raised ridge adapted to be located within said slot of said cartridge when said cartridge is slid past said slide bracket;
    whereby said cartridge is selectively slidable with respect to said cross shaft along said central axis such that said cartridge is selectively removable and replaceable on said cross shaft while said cross shaft remains mounted to the support structure.

2. The mounting assembly of claim 1 wherein said cartridge includes a first foot attached to said first leg and a second foot attached to said second leg, said slot being located between said first foot and said second foot.

3. The mounting assembly of claim 1 wherein said cartridge includes a second sleeve adapted to mount the scraper blades to said cartridge.

4. The mounting assembly of claim 3 wherein said second sleeve includes a generally T-shaped channel adapted to slidably mount the scraper blades to said cartridge.

5. The mounting assembly of claim 1 wherein said cross shaft includes a first aperture, and said cartridge includes a second aperture adapted to be aligned with said first aperture, said mounting assembly including a fastener adapted to be inserted through said first aperture and said second aperture to thereby connect said cartridge to said cross shaft such that said cartridge is not slidable with respect to said cross shaft, said fastener being selectively removable from said first aperture such that said cartridge is selectively slidable with respect to said cross shaft.

6. The mounting assembly of claim 1 wherein said wall of said slide bracket comprises a bottom wall and said raised ridge extends upwardly from said bottom wall, said raised ridge spacing said cross shaft from said bottom wall of said slide bracket.

7. The mounting assembly of claim 1 including a mounting bracket adapted to be attached to the stationary structure, said mounting bracket including a guideway adapted to slidably receive said slide bracket, whereby said slide bracket is slidable within said guideway with respect to said mounting bracket.

8. The mounting assembly of claim 7 including a tensioner located between said mounting bracket and said slide bracket, said tensioner adapted to provide sliding movement of said slide bracket with respect to said mounting bracket.

9. The mounting assembly of claim 1 wherein said slide bracket includes a leg having a first aperture, said leg of said slide bracket being spaced apart from said cross shaft such that said cartridge is slidable between said leg of said slide bracket and said cross shaft, said cartridge including a second aperture adapted to be aligned with said first aperture, said mounting assembly including a fastener adapted to be removably inserted into said first aperture and said second aperture to prevent sliding movement of said cartridge with respect to said cross shaft.

10. The mounting assembly of claim 1 wherein said cross shaft includes a stiffener, said stiffener adapted to extend through said slot of said cartridge.

11. A scraper blade for a conveyor belt cleaner including:
a mounting base including an arm having a top end, a bottom end, a front surface, and a rear surface; and
a scraping element having a lower portion and a generally planar upper portion, said upper portion including a scraping tip adapted to engage a conveyor belt, said lower portion being disposed at an angle to said upper portion and being embedded within said arm between said front surface and said rear surface;
whereby said scraping tip is pivotal about a pivot axis that is offset from a plane containing said upper portion of said scraping element.

12. The scraper blade of claim 11 wherein said scraping element is formed from a metal material and said arm is formed from an elastomeric material.

13. The scraper blade of claim 11 wherein said arm is disposed at an angle to said upper portion of said scraping element.

14. The scraper blade of claim 11 wherein said front surface of said arm is generally planar and is disposed at an angle to said upper portion of said scraping element.

15. The scraper blade of claim 11 wherein said mounting member includes a generally T-shaped mounting flange, said bottom end of said arm being attached to said mounting flange.

16. The scraper blade of claim 15 wherein said mounting member includes a first apron and a second apron, and said mounting flange includes a first tongue and a second tongue, said first apron and said first tongue forming a first groove therebetween, and said second apron and said second tongue forming a second groove therebetween.

17. A mounting assembly for mounting one or more conveyor belt cleaner scraper blades to a support structure, said mounting assembly including:
a cross shaft having a first end, a second end, a first aperture and a generally linear central axis, said first end and said second end of said cross shaft adapted to be mounted to the support structure;
a cartridge having a first end, a second end, a second aperture, and a first sleeve, said first sleeve including a first leg, a second leg spaced apart from said first leg, a chamber located between said first leg and said second leg adapted to receive said cross shaft, and a slot in communication with said chamber, said slot adapted to facilitate removal of said cartridge from said cross shaft, said cartridge adapted to mount the scraper blades to said cross shaft, said second aperture of said cartridge adapted to be aligned with said first aperture of said cross shaft; and
a fastener adapted to be inserted through said first aperture of said cross shaft and said second aperture of said cartridge to thereby connect said cartridge to said cross shaft such that said cartridge is not slidable with respect to said cross shaft, said fastener being selectively removable from said first aperture such that said cartridge is selectively slidable with respect to said cross shaft;
whereby said cartridge is selectively slidable with respect to said cross shaft along said central axis such that said cartridge is selectively removable and replaceable on said cross shaft while said cross shaft remains mounted to the support structure.

18. A mounting assembly for mounting one or more conveyor belt cleaner scraper blades to a support structure, said mounting assembly including:
a cross shaft having a first end, a second end, a stiffener, and a generally linear central axis, said first end and said second end of said cross shaft adapted to be mounted to the support structure;
a cartridge having a first end, a second end and a first sleeve, said first sleeve including a first leg, a second leg spaced apart from said first leg, a chamber located between said first leg and said second leg adapted to receive said cross shaft, and a slot in communication with said chamber, said stiffener of said cross shaft adapted to extend through said slot, said slot adapted to facilitate removal of said cartridge from said cross shaft, said cartridge adapted to mount the scraper blades to said cross shaft;
whereby said cartridge is selectively slidable with respect to said cross shaft along said central axis such that said cartridge is selectively removable and replaceable on said cross shaft while said cross shaft remains mounted to the support structure.

* * * * *